United States Patent
Walrath

(10) Patent No.: US 6,899,494 B2
(45) Date of Patent: May 31, 2005

(54) ROTARY METAL CUTTING TOOL

(76) Inventor: Richard J. Walrath, 1286 Gower Rd., Scotia, NY (US) 12302

( * ) Notice: Subject to any disclaimer, the term of this patent is extended or adjusted under 35 U.S.C. 154(b) by 0 days.

(21) Appl. No.: 10/845,379

(22) Filed: May 14, 2004

(65) Prior Publication Data

US 2004/0258490 A1 Dec. 23, 2004

Related U.S. Application Data

(63) Continuation-in-part of application No. 10/314,485, filed on Dec. 9, 2002, now abandoned.

(51) Int. Cl.[7] .............................................. B23B 51/00
(52) U.S. Cl. ............................. 407/54; 407/56; 407/63
(58) Field of Search .............................. 407/54, 56, 63, 407/53, 55, 113; 408/230

(56) References Cited

U.S. PATENT DOCUMENTS

| 3,798,723 | A | * | 3/1974 | Czopor et al. | ................. | 407/53 |
| 5,322,394 | A | * | 6/1994 | Okanishi et al. | ............... | 407/32 |
| 5,779,399 | A | * | 7/1998 | Kuberski | ...................... | 407/54 |
| 6,164,876 | A | * | 12/2000 | Cordovano | ................... | 407/59 |
| 6,179,528 | B1 | * | 1/2001 | Wardell | ........................ | 407/54 |
| 6,443,674 | B1 | * | 9/2002 | Jaconi | ......................... | 408/1 R |

* cited by examiner

Primary Examiner—Willmon Fridie, Jr.
(74) Attorney, Agent, or Firm—John F. McDevitt

(57) ABSTRACT

A rotary end-mill is disclosed having a deferential flute construction with all individual flutes being unequally spaced about the circumference of the cylindrical tool body at different helix angles. The cutting edges of these flutes also face in the direction of tool rotation 19 Claims, 2 Drawing Sheets

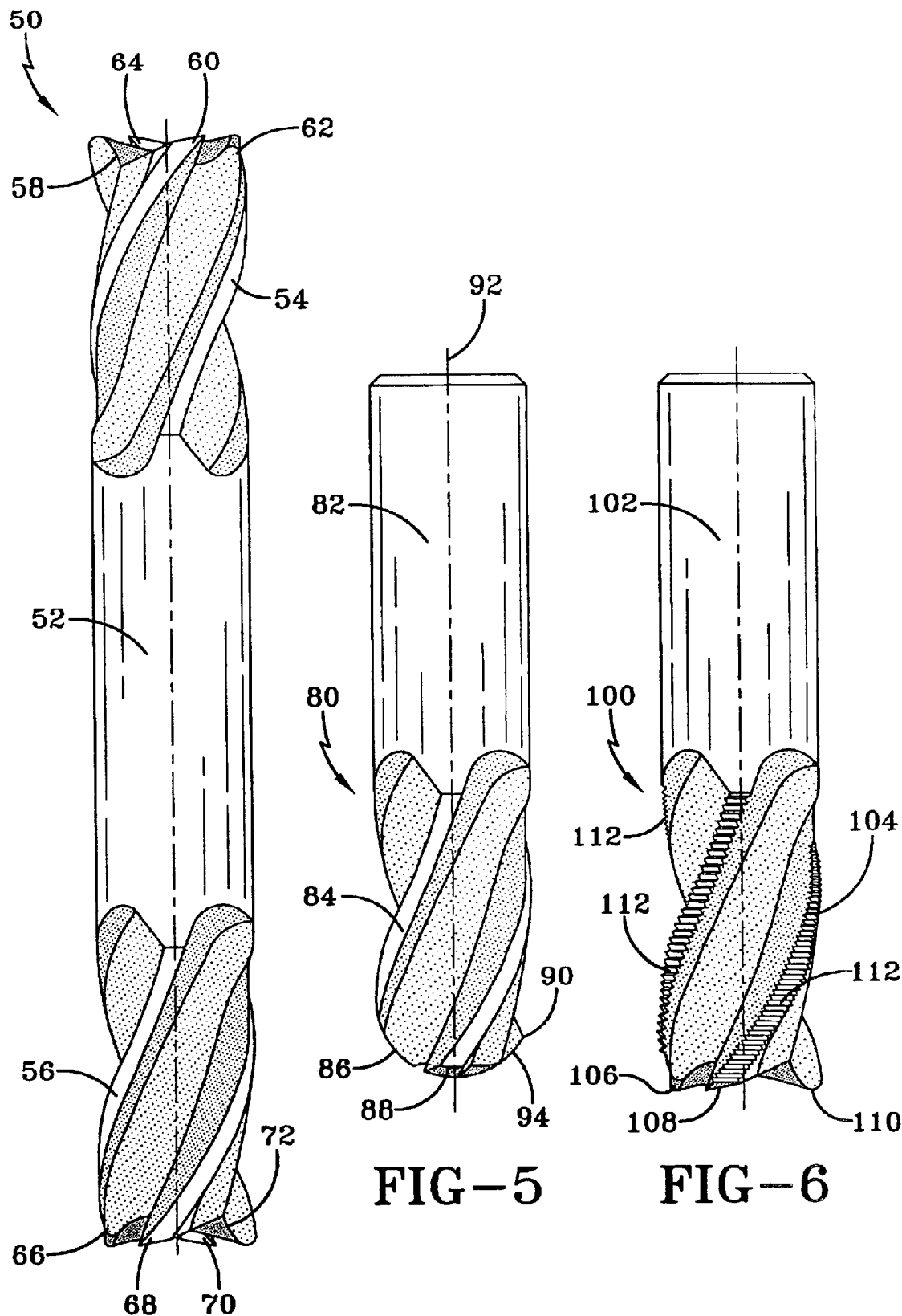

US 6,899,494 B2

ROTARY METAL CUTTING TOOL

RELATED PROVISIONAL APPLICATION

This is a continuation in part of application Ser. No. 10/314,485 filed by the present applicant on Dec. 9, 2002 and now abandoned.

BACKGROUND OF THE INVENTION

The present invention relates generally to rotating end-mill metal cutting tools and more specifically to a particular construction of said machining tools providing significantly improved performance when put into use.

A variety of end-mills for use with rotating milling machines are well known and are being used. Depending on design, such end-mills are generally used in right or left hand cutting operations, spiral and center cutting operations as well as chamfering operations, and the like. Conventionally, these end-mills are constructed with different types of hardened steel as well as tungsten carbide, including tungsten carbide inserts, and are often given additional structural features such as a corner radius at the cutting ends, tapered cutting ends, ball shaped cutting ends, uneven cutting edges for rough milling operations including serrations and still other edge contours. Likewise, these end-mills can be provided for longer wear with wear-resistant coatings including tungsten carbide, amorphous diamond and various nitride compositions. It is still further known with end-mills employing helical cutting flutes to vary the radial rake of the cutting edges with respect to the relative hardness of the particular metal being machined. In such manner a higher radial rake is generally provided for machining softer metals while a lower radial rake is employed for machining harder metals.

In U.S. Pat. No. 4,963,059 there is disclosed a rotary end-mill metal cutting tool with a central axis of rotation therethrough. Said cutting tool includes a cylindrical body with a shank end and a cutting end, said cutting end including an even number of helical cutting flutes being equally spaced in pairs about the circumference of said cutting end. Said equispaced helical cutting flutes are said to be disposed perpendicular to the axis of rotation for the tool body with at least one of said helical cutting flutes being disposed at a helix angle different from the helix angles of the other helical cutting flutes. A ball-nose end-mill having said helical cutting flute construction is also disclosed in said reference.

SUMMARY OF THE INVENTION

The present invention provides a novel construction for rotary end-mill cutting tools demonstrating unexpectedly superior performance advantages. In comparison tests with several other commercially available end-mills, the present end-mill construction proved consistently superior in both profile cutting and slotting procedures. Higher tool speeds with lesser noise during operation were experienced with the present tool construction when machining steel workpieces and is expected to exhibit superior performances on aluminum workpieces.

It is an object of the present invention, therefore, to provide an improved end-mill tool construction enabling higher cutting speeds to be employed than with similar tool constructions.

It is another object of the present invention to provide a novel end-mill tool construction enabling better chip flow during operation to reduce or eliminate flute clogging.

It is also an object of the present invention to provide an end-mill cutting tool which greatly reduces the noise caused by contact between the cutting tool and the workpiece.

It is yet another object of the present invention to provide an end-mill cutting tool which produces an improved surface finish on the machined workpiece.

It is a still further object of the present invention to reduce machine spindle wear with use of the present tool construction.

These and still further objects of the present invention are achieved with an end-mill metal cutting tool having a cylindrical body with a shank end and a cutting end, said cutting end including a plurality of helical cutting flutes unequally spaced from each other about the circumference of said cutting end, and said cutting flutes each being oriented at a different helix angle with respect to all remaining cutting flutes. In a preferred embodiment, the cutting end of the present tool construction employs three helical cutting flutes unequally spaced about the circumference of said cutting end, the first helical cutting flute being angularly displaced from the zero angle position on said circumference, the second helical cutting flute being angularly displaced from the one hundred twenty degree angle position on said circumference and the third helical cutting flute being angularly displaced from the two hundred forty degree angle position on said circumference, said helical cutting flutes also being oriented at a different helix angle with respect to all remaining cutting flutes. In different embodiments of the present tool construction, a greater odd number of helical flutes can be employed as can be various even number helical flute constructions. It is only required for such other tool embodiments of the present invention that the above specified combination of structural features be maintained with respect to unequal flute spacing together with having different helix angles for the individual flute members.

BRIEF DESCRIPTION OF THE DRAWINGS

FIG. 4 is again a side view for a representative double ended end-mill of the present invention having an intermediate shank end with a cutting end at each end of said shank end.

FIG. 5 is also a side view for a representative end-mill of the present invention having a single cutting end terminating in a ball configuration.

FIG. 6 is still another side view for a representative end-mill of the present invention having helical flutes with an uneven cutting edge which is formed with serrations disposed on said cutting edge.

DETAILED DESCRIPTION OF THE PREFERRED EMBODIMENTS

Figure 1:
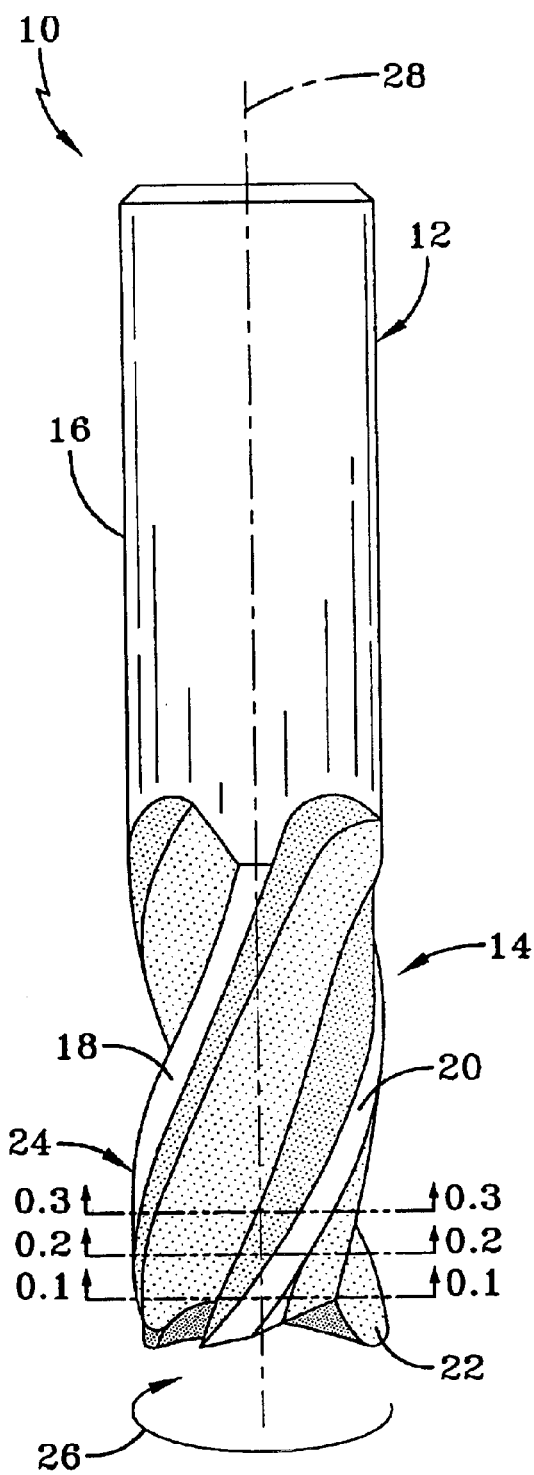
FIG. 1 is a side view for a representative right-hand end-mill construction according to the present invention.
Figure 2:
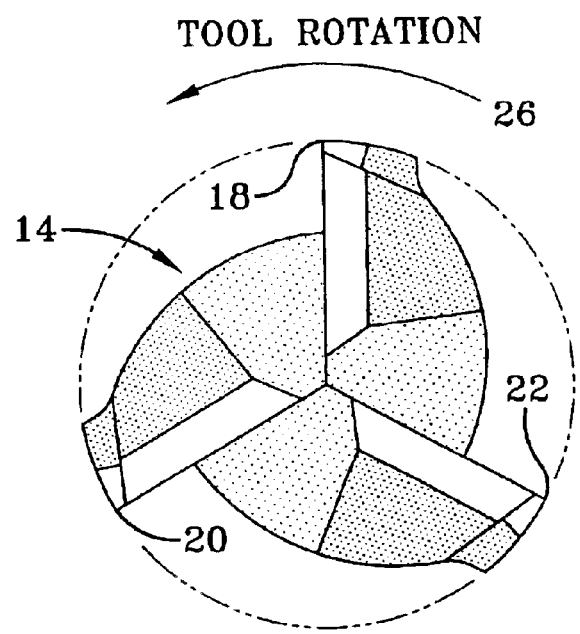
FIG. 2 is a partial end view for the cutting end of the FIG. 1 end-mill.

Referring to the drawings, FIG. 1 depicts an end-mill 10 of the present invention having a shank end 12 and a cutting end 14. Said tool member does not further include retention or locking means being included on the shank end of said depicted tool since a collet or other type holder device can be employed to secure said tool in existing milling machines. On the other hand, it is contemplated that a flat recessed section can be disposed on the shank end of the depicted tool for said purpose. Shank end 12 of end-mill 10 is essentially cylindrical in shape having a circular peripheral outer surface 16. Cutting end 14 of end-mill 10 includes three helical cutting flutes, 18, 20 and 22, respectively, although a greater number of said helical cutting flutes is contemplated. Said depicted helical cutting flutes lands are identical in physical size while being unequally spaced from each other about the circumference of said cutting end on the depicted tool. For example, it has been determined with such tool construction having an overall three inch length, a 0.50 inch diameter and a one inch length cutting end that flute 18 can be positioned approximately one degree ahead of center as its joinder site with the shank end, flute 20 can be positioned there approximately at the minus one hundred twenty-one degree location and flute 22 can be located at such joinder site at approximately a minus two hundred thirty-seven degree location. Said helical cutting flutes spiral about the outer circumference of said end-mill 10 with each flute having a cutting edge 24 facing the cutting path 26. Flute 18 is further disposed at approximately a thirty-eight degree helix angle with respect to the central axis of rotation 28 for said tool member. Flute 20 is similarly aligned at a thirty-five degree helix angle whereas remaining flute 22 is again similarly aligned at an approximate forty-one degree helix angle. The partial end view in FIG. 2 for said FIG. 1 cutting tool depicts the circumferential spacing relationship for cutting flutes being employed therein.

Figure 3:
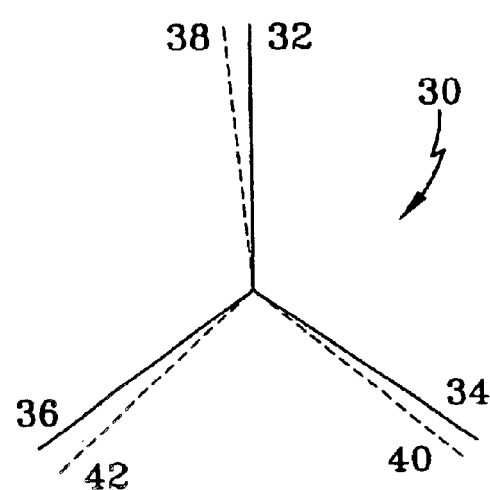
FIG. 3 is a graphical representation for a cross section of the FIG. 1–2 tool construction depicting unequal spacing of the helical cutting flutes about the tool circumference.

FIG. 3 is a graph for a cross section of the FIG. 1 tool construction to help further explain change taking place in the angular displacement of the illustrated helical flutes 18, 20 and 22 with length change in the cutting end of said tool member. Said graph 30 includes solid lines representing a zero degree point 32 perpendicular to the central axis of the tool rotation 28, a one hundred and twenty degree point 34 in said rotational path and a two hundred forty degree point 36 in said rotational path. Dash lines 38, 40 and 42 represent angular displacement from points 32, 34 and 36, respectively, and which has been shown in said graph 30 for the flute construction herein being illustrated. Said dash lines further depict angular displacement for the individual flutes 18, 20 and 22 at the lowest point in the cutting end 14 of the illustrated tool member. More particularly, dash line 38 indicates a one degree ahead of center for flute 18 at such lowest cutting end position. Similarly dash line 40 indicates a minus one hundred twenty-one degree location for flute 20 while remaining flute 22 is shown to have a minus two hundred thirty-seven degree location. At a 0.1 inch distance in said flute construction up from such lowest end position, the respective angular displacements are found to be again plus one degree, minus one hundred nineteen point fourteen and minus two hundred thirty-nine point zero degrees. At a 0.2 inch further elevation point, the angular displacements become plus one degree, minus one hundred seventeen point twenty-eight degrees and minus two hundred forty-one point zero four degrees while at a 0.3 inch elevation distance mark the angular displacements are found to be plus one degree, minus one hundred fifteen point forty-two degrees and minus two hundred forty-three point zero six degrees, respectively. It will be appreciated that the herein illustrated angular displacement will vary over a wide range depending upon tool size and shape, number of selected helical flutes and selected helix angles possibly extending from about twenty degrees up to about sixty degrees. Additionally, it will be further appreciated that a suitable selection for unequal spacing and unequal helix angles of all helical flutes in the present tool member can also depend on such other considerations as the intended machining use for said end-mill.

Comparative machining tests were conducted for the above illustrated tool member. The performance of the above illustrated tool member in profile and slot cutting of a hardened steel workpiece was compared with the cutting performance of two commercially available four flute cutters now being used for said purpose. In conducting such comparison, these end-mills were operated at a cutting speed of 3000 rpm with varying cutter feed rates. The profile cutting performance for both commercial tools experienced considerable vibrational noise during operation at a feed rate of 24 inches per minute. Very little noise was experienced during profile cutting at the same feed rate as well as at higher feed rates of 40 and 45 inches per minute. Better surface finish on the machined workpiece was also achieved with the present tool member as compared with the surface finish produced with both commercial cutters in these tests. The slot cutting tests with these cutters demonstrated a like superiority for the present tool member. Thus, both commercial cutters experienced significant noise during operation whereas the present tool member experienced little noise during the latter comparison at the same cutter rotation and cutter feed rate. Similar superiority was achieved with the present tool member when cutting an aluminum alloy workpiece at considerably higher tool speeds. The present tool member further removed chips well with no apparent re-cut or build-up on the workpiece under mist lubrication conditions.

In FIG. 4 there is shown a side view for a typical double ended end-mill member 50 of the present invention having a plurality of helical cutting flutes at each end which are unequally spaced from each other about the circumference of both cutting ends and with said helical cutting flutes at both cutting ends being oriented at a different helix angle with respect to all remaining cutting flutes. Said four flute tool member 50 includes an intermediate Weldon type cylindrical shank 52 having cutting ends 54 and 56 at both ends of said shank end which are of the same construction. Accordingly, cutting end 54 has four helical cutting flutes, 58, 60, 62 and 64 while cutting end 56 includes identical cutting flutes 66, 68, 70 and 72. Said depicted helical cutting flutes are again identical in physical size while being unequally spaced from each other about the circumference of both cutting ends and with each depicted helical cutting flute at both cutting ends being oriented at a different helix angle with respect to all remaining cutting flutes at the same end.

FIG. 5 depicts a typical three flute end-mill member 80 of the present invention having a single cutting end terminating in a ball shaped configuration. Said end-mill is otherwise the same construction previously described for the FIG. 1 tool embodiment with respect to employing identical helix angles and unequal spacing of the individual cutting flutes for the present tool member at the same overall physical dimensions. Depicted tool member 80 includes a cylindrical shank end 82 joined to a cutting end 84 having three helical cutting flutes 86, 88 and 90. Said cutting flutes are again identical in physical size while being unequally spaced from each other about the circumference of the depicted cutting end. Additionally, flute 86 is further disposed at an approximately a thirty-eight helix angle with respect to the central axis of rotation 92 for said tool member while flute 88 is similarly aligned at a thirty-five degree helix angle and remaining flute 90 is also similarly aligned at an approximate forty-one degree helix angle. The ball shaped termination 94 for the cutting end 84 of the depicted tool member can be of a conventional spherical shape.

FIG. 6 is a side view for a representative three flute roughing end-mill 100 of the present invention again having multiple helical cutting flutes at one end which are unequally spaced from each other as well as being oriented at different helix angles. Depicted end-mill 100 includes cylindrical shank end 102 and cutting end 104 with the cutting end of the depicted tool construction employing three helical cutting flutes 106, 108 and 110. As can be seen, the respective cutting edges for said helical cutting flutes are uneven and consist of serrations 112 formed on all leading flute edges. The depicted tool member can again have the same remaining construction previously described for the FIG. 1 tool embodiment with the same helix angles and unequal spacing for the individual cutting flutes being employed.

It is believed that the present tool geometry of deferentially spacing the flute elements in the present tool member with different helix angles breaks up the chatter harmonics encountered during the milling process thereby lowering the cutting noise ordinarily encountered during customary operating conditions. Such improved operation compared with conventional end-mill geometries imparts greater dynamic stability of the tool member during the milling process with decreased cutting noise. Such improved dynamic stability achieved with the present tool geometry should permit greater depths of cuts to be made with stable operation together with improved cutting productivity as above demonstrated in the foregoing comparative tests.

While various representative embodiments of the present invention has been herein described, it is to be understood that still other embodiments of the present tool construction are also contemplated. For example, left hand end-mills, reamers, tapered end-mills and the like can also employ the present tool geometry with improved cutting performance. Likewise a greater number of flute elements than above illustrated can be employed to similar advantage, including both odd number and even number flute constructions. Consequently, it is intended to cover all variations in the disclosed tool construction which may be devised by persons skilled in the art as falling within the true spirit and scope of the herein claimed invention.

What is claimed is:

1. An end-mill metal cutting tool having a cylindrical body with a shank end and a cutting end, said cutting end including a plurality of non-intersecting helical cutting flutes all unequally spaced from each other about the circumference of said cutting end, and said helical cutting flutes each being oriented at a different helix angle with respect to all remaining cutting flutes while further having continuous cutting edges formed in each flute member, said unequal helix angles and unequal spacing for all cutting flutes combining to reduce vibration harmonics during the machining process.

2. The end-mill tool of claim 1 having an odd number of helical cutting flutes.

3. The end-mill tool of claim 1 having an even number of helical cutting flutes.

4. The end-mill tool of claim 1 having a larger length shank end than the length of the cutting end.

5. The end-mill tool of claim 1 having a shorter length shank end than the length of the cutting end.

6. The end-mill tool of claim 1 having an intermediate shank end with a cutting end at each end of said shank end.

7. The end-mill tool of claim 1 having a ball end cutting end.

8. The end-mill tool of claim 1 for performing a rough milling operation on a workpiece, said end-mill tool having helical flutes with an uneven cutting edge.

9. The end-mill tool of claim 8 wherein said cutting edge is serrated.

10. The end-mill tool of claim 1 wherein the end face of the cutting part includes a corner radius at the cutting end.

11. The end-mill tool of claim 1 wherein the radial rake provided on the cutting flutes varies with respect to the relative hardness of the metal being machined.

12. The end-mill tool of claim 11 wherein a higher radial rake is provided for machining softer metals.

13. The end-mill tool of claim 11 wherein a lower radial rake is provided for machining harder metals.

14. The end-mill tool of claim 8 having a ball end cutting end.

15. The end-mill tool of claim 1 having an outer tapered contour.

16. The end-mill tool of claim 1 having a wear-resistant surface coating on the cutting end.

17. The end-mill tool of claim 1 wherein the shank end includes a flat locking section.

18. A cylindrical metal cutting end-mill tool having a shank end and a cutting end, said cutting end having three non-intersecting helical cutting flutes unequally spaced about the circumference of said cutting end, the first helical cutting flute being angularly displaced from the zero angle position on said circumference, the second helical cutting flute being angularly displaced from the one hundred twenty degree angle position on said circumference, and the third helical cutting flute being angularly displaced from the two hundred forty degree angle position on said circumference, said helical cutting flutes also each being oriented at a different helix angle with respect to all remaining cutting flutes while further having continuous cutting edges formed in each flute member, said unequal helix angles and unequal spacing for all cutting flutes combining to reduce vibration harmonics during the machining process.

19. The end-mill tool of claim 18 having a helix angle of approximately thirty-eight degrees for the first helical cutting flute, a helix angle of approximately thirty-five degrees for the second helical cutting flute, and a helix angle of approximately forty-one degrees for the third helical cutting flute.

* * * * *